United States Patent
Kobuse

(10) Patent No.: US 10,313,617 B2
(45) Date of Patent: Jun. 4, 2019

(54) IMAGE CAPTURING APPARATUS, CONTROL METHOD FOR THE SAME, AND STORAGE MEDIUM

(71) Applicant: CANON KABUSHIKI KAISHA, Tokyo (JP)

(72) Inventor: Takenori Kobuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 15/052,109

(22) Filed: Feb. 24, 2016

(65) Prior Publication Data

US 2016/0261810 A1 Sep. 8, 2016

(30) Foreign Application Priority Data

Mar. 3, 2015 (JP) .................. 2015-041774

(51) Int. Cl.
- *H04N 5/359* (2011.01)
- *H04N 5/3745* (2011.01)
- *H04N 5/378* (2011.01)

(52) U.S. Cl.
CPC .......... *H04N 5/3595* (2013.01); *H04N 5/378* (2013.01); *H04N 5/3745* (2013.01); *H04N 5/37455* (2013.01); *H04N 5/37457* (2013.01)

(58) Field of Classification Search
CPC ............... H04N 5/3595; H04N 5/3745; H04N 5/37457; H04N 5/37455; H04N 5/378; H04N 5/359
USPC ................................ 348/294, 300, 301, 248
See application file for complete search history.

(56) References Cited

U.S. PATENT DOCUMENTS

| | | | | |
|---|---|---|---|---|
| 7,999,864 B2 * | 8/2011 | Ishida | ............. | H04N 5/3598 348/222.1 |
| 2006/0082675 A1 * | 4/2006 | McGarvey | ............. | H04N 3/1568 348/362 |
| 2009/0224952 A1 * | 9/2009 | Funabashi | ............. | H04N 5/185 341/142 |
| 2009/0244340 A1 * | 10/2009 | Watanabe | ............. | H04N 3/155 348/294 |
| 2010/0013969 A1 * | 1/2010 | Ui | ............. | H04N 5/35545 348/294 |
| 2010/0309356 A1 * | 12/2010 | Ihara | ............. | H04N 5/3658 348/300 |

(Continued)

FOREIGN PATENT DOCUMENTS

| | | |
|---|---|---|
| JP | 2007-020156 A | 1/2007 |
| JP | 2009-177749 A | 8/2009 |

(Continued)

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An image capturing apparatus including a pixel portion in which pixels that convert entered light into electric signals are arranged in a matrix, a column output line provided for each pixel column of the pixel portion, a clip portion configured to clip, at a predetermined signal level, signals respectively output from the pixels to the column output lines, an A/D conversion portion configured to A/D convert the signals clipped by the clip portion, and a control unit configured to change a signal level at which clipping is performed by the clip portion according to a maximum value of a conversion range of the A/D conversion portion.

9 Claims, 6 Drawing Sheets

(56) References Cited

U.S. PATENT DOCUMENTS

| | | | | |
|---|---|---|---|---|
| 2011/0025874 A1* | 2/2011 | Tamaoki | ............... | H04N 5/361 |
| | | | | 348/222.1 |
| 2011/0292264 A1* | 12/2011 | Kubo | ................... | H04N 5/3598 |
| | | | | 348/301 |
| 2012/0194367 A1* | 8/2012 | Wang | ................. | H03M 1/1014 |
| | | | | 341/120 |
| 2013/0162458 A1* | 6/2013 | Nishikido | ............... | H03M 1/50 |
| | | | | 341/166 |
| 2014/0016010 A1* | 1/2014 | Uchida | ............. | H04N 5/37455 |
| | | | | 348/308 |

FOREIGN PATENT DOCUMENTS

| | | |
|---|---|---|
| JP | 2011-030097 A | 2/2011 |
| JP | 2013-106186 A | 5/2013 |
| JP | 2013-121119 A | 6/2013 |
| JP | 2014-165676 A | 9/2014 |

\* cited by examiner

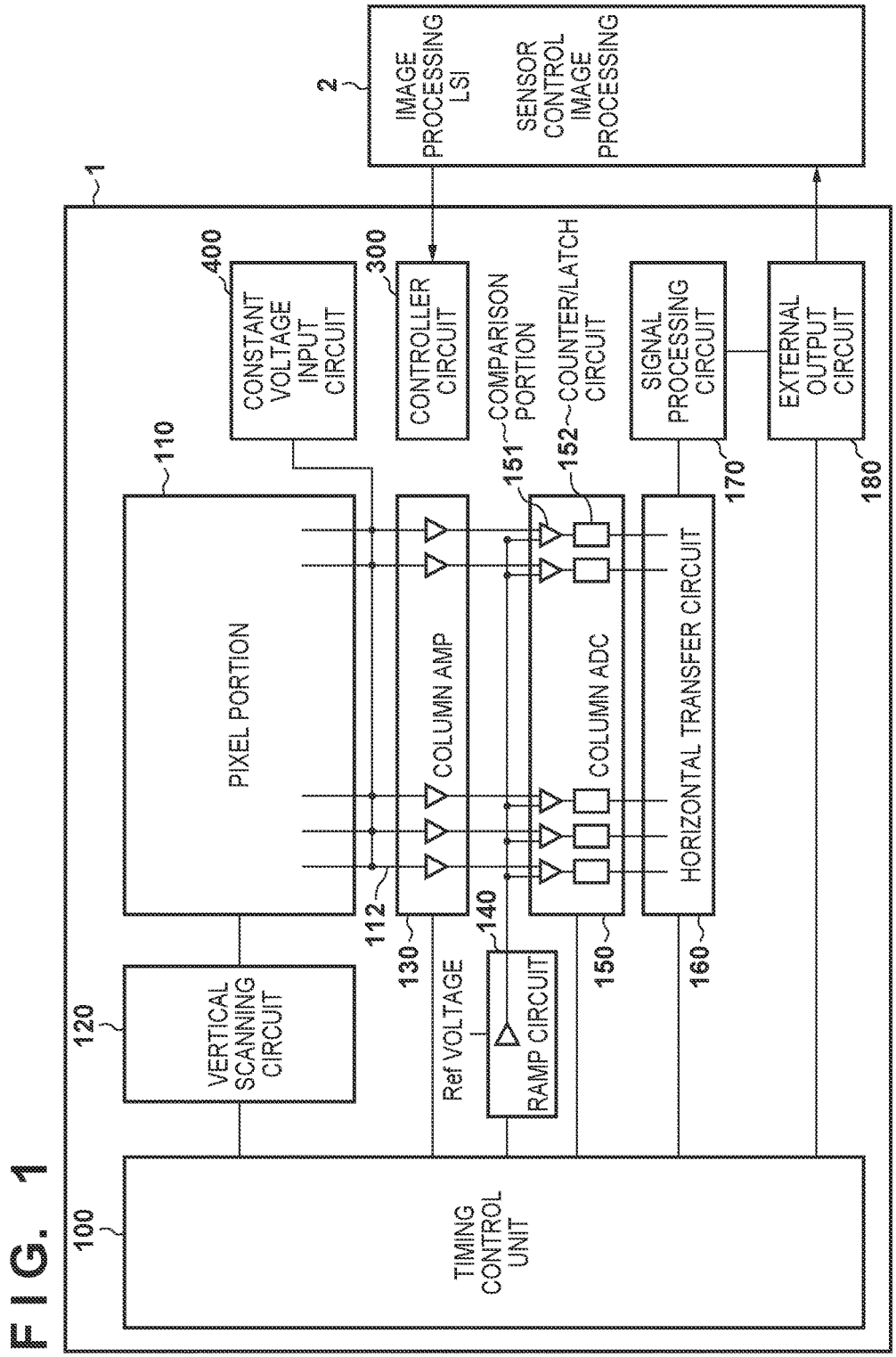

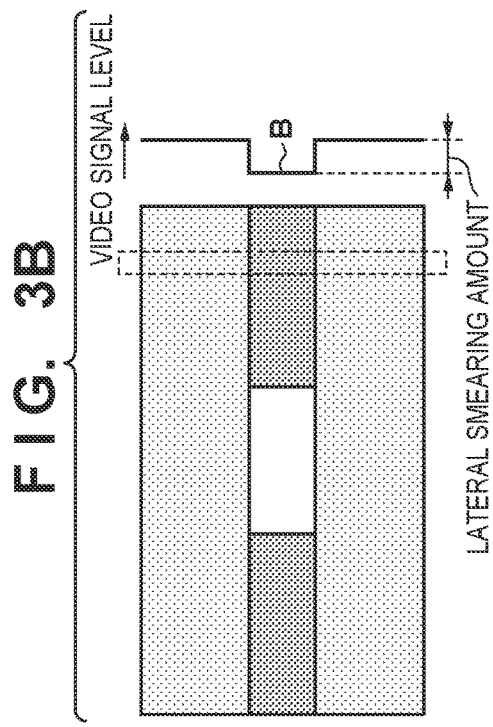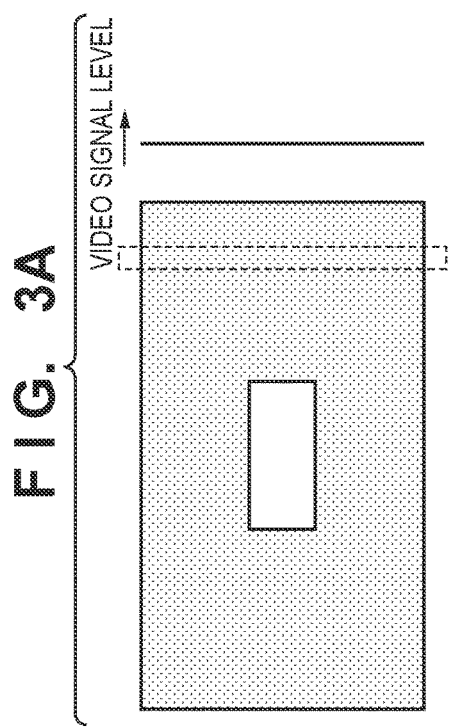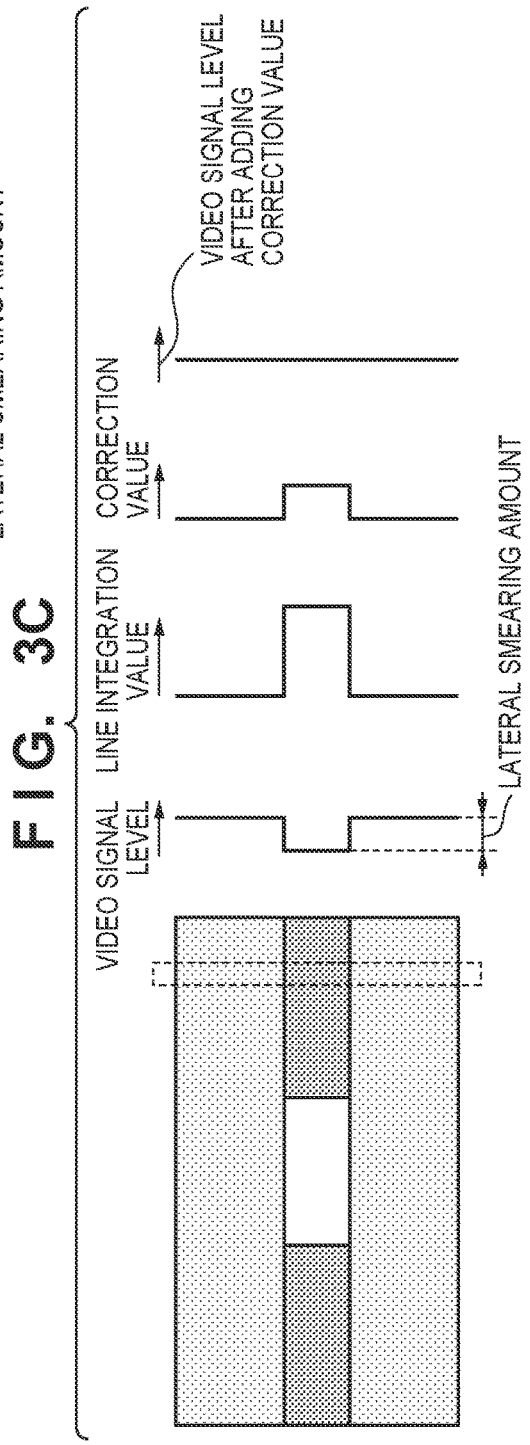

IMAGE CAPTURING APPARATUS, CONTROL METHOD FOR THE SAME, AND STORAGE MEDIUM

BACKGROUND OF THE INVENTION

Field of the Invention

The present invention relates to an image capturing apparatus and a control method for the same.

Description of the Related Art

In recent years, in the field of image capturing apparatuses such as digital cameras, CMOS sensors superior in pixel readout speed and low power consumption are often used instead of CCDs. It is widely known that smearing occurs in the vertical direction in CCDs when an image of a high luminance subject is captured. On the other hand, the structure of CMOS sensors prevents smearing from occurring in the vertical direction in the case where an image of a high luminance subject is captured. However, there are cases in which the output level of a circuit in the image sensor fluctuates, resulting in the occurrence of lateral stripe-shaped or lateral band-shaped level fluctuation in the horizontal direction of the same line, that is, so-called lateral smearing. The level of fluctuation of the internal circuit changes depending on the luminance level of the captured image of the high luminance subject, and therefore there is a need to accurately grasp the luminance level of the captured image of the high luminance subject in order to favorably correct lateral smearing.

In Japanese Patent Laid-Open No. 2014-165676, in the case where an image of a high luminance subject is captured with an image capturing apparatus, correction is performed line-by-line on an output signal from a valid pixel portion by counting the number of pixels that have a signal level, in the output signal from the valid pixel portion, greater than or equal to a certain threshold value for each line, and inferring a lateral smearing level by using the counted numbers.

A video signal from the image sensor is converted into a digital value through analog/digital (A/D) conversion, and if an image of a high luminance subject is captured in the output signal from the image sensor, the digital value of the video signal gets stuck at a maximum value, and blown-out highlights occur.

For this reason, as described in Japanese Patent Laid-Open No. 2014-165676, when counting a signal that has a value equal to or higher than a certain threshold, the detailed signal level prior to A/D conversion is not known for the portion with blown-out highlights. In particular, in the case where an analog gain is applied to the subsequent stage of the block in the image sensor in which lateral smearing occurs and the voltage conversion range of the A/D conversion is smaller than a signal voltage level of the analog signal input to the A/D conversion portion, a state occurs in which the lateral smearing amount and the digital value of the signal are not proportional. For this reason, an accurate correction cannot be made.

SUMMARY OF THE INVENTION

The present invention has been made in light of the issues described above and can accurately correct lateral stripe noise and lateral band noise in the case where light from a high luminance subject has entered the image capturing apparatus.

According to a first aspect of the present invention, there is provided an image capturing apparatus comprising: a pixel portion in which pixels that convert entered light into electric signals are arranged in a matrix; a column output line provided for each pixel column of the pixel portion; a clip portion configured to clip, at a predetermined signal level, signals respectively output from the pixels to the column output lines; an A/D conversion portion configured to A/D convert the signals clipped by the clip portion; and a control unit configured to change a signal level at which clipping is performed by the clip portion, according to a maximum value of a conversion range of the A/D conversion portion.

According to a second aspect of the present invention, there is provided a method for controlling an image capturing apparatus that includes a pixel portion in which pixels that convert entered light into electric signals are arranged in a matrix and a column output line provided for each pixel column of the pixel portion, the method comprising: clipping, at a predetermined signal level, signals respectively output from the pixels to the column output lines; A/D converting the signals clipped in the clipping; and changing a signal level at which clipping is performed in the clipping according to a maximum value of a conversion range in the A/D conversion.

Further features of the present invention will become apparent from the following description of exemplary embodiments with reference to the attached drawings.

BRIEF DESCRIPTION OF THE DRAWINGS

FIG. 1 is a block diagram showing a configuration of an image capturing apparatus according to a first embodiment of the present invention.

FIGS. 3A to 3C are schematic diagrams showing lateral smearing and a correction method for the same.

DESCRIPTION OF THE EMBODIMENTS

Figure 2A:
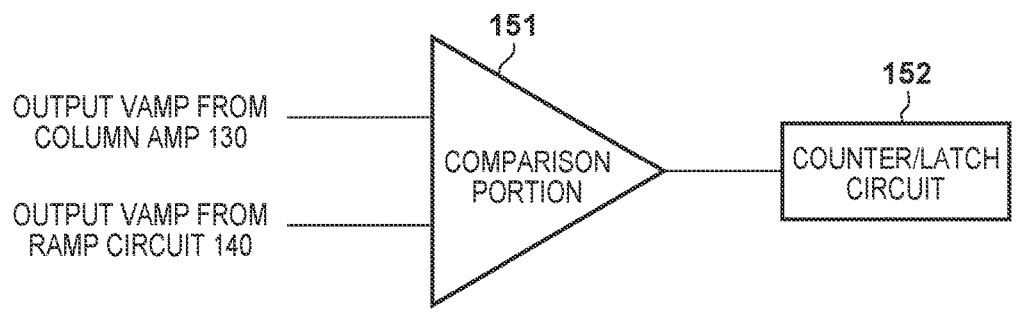
FIGS. 2A and 2B are diagrams showing a configuration and operation timing of a column A/D converter.

Embodiments according to the present invention will be described below in detail with reference to the attached drawings.

First Embodiment

FIG. 1 is a block diagram showing the configuration of an image capturing apparatus according to the first embodiment of the present invention. In FIG. 1, an image sensor 1 is a CMOS-type image sensor to which a parallel-type A/D converter is mounted. An image processing LSI 2 performs correction including OB clamp correction in addition to image processing such as white balance processing and gamma processing on image data output by the image sensor 1. Then, the processed image data is ultimately recorded in a recording medium. Also, the image processing LSI 2 has a built-in CPU and the image processing LSI 2 uses the CPU to communicate with (e.g. serial communication) and control the image sensor 1 according to the operation mode of the image capturing apparatus. In the image capturing apparatus according to the present embodiment, correction of lateral smearing such as lateral stripe noise (stripe-shaped noise in the line direction) and lateral band noise (band-shaped noise in the line direction) is performed on image data obtained by the image processing LSI 2. The method for correcting lateral smear will be described later.

Also, the image sensor 1 includes a pixel portion 110, a vertical scanning circuit 120, a column amplifier (column AMP) 130, a ramp circuit 140, a column A/D converter (column ADC) 150, a horizontal transfer circuit 160, a signal processing circuit 170, an external output circuit 180, and a controller circuit 300. The controller circuit 300 is an interface circuit with the image processing LSI 2, and accepts control from the CPU of the image processing LSI 2 to the image sensor 1 using serial communication or the like.

In the pixel portion 110, pixels that generate an electric charge according to to the amount of entered light using photoelectric conversion and output the electric charge as a voltage (electric signal) are arranged in a matrix. A column output line 112 is arranged in each of the pixel columns of the pixel portion 110. A color filter and a micro lens are mounted on the surface of a photoelectric conversion element (photodiode) constituting each pixel. In the present embodiment, by using color filters of the three colors red (R), green (G), and blue (B), the periodic structure of a so-called Bayer array due to the RGB primary color filters is adopted, but the present embodiment is not necessarily limited to this configuration.

A timing control unit 100 controls operations by supplying an operation CLK to each block of the image sensor 1 and supplying a timing signal to each block. The vertical scanning circuit 120 performs timing control for sequentially outputting the signal voltages of the pixels arranged two-dimensionally in the pixel portion 110 within one frame. Generally, video signals are sequentially output line-by-line from the top line to the bottom line of one frame.

The column amplifier 130 is used to electrically amplify the signals output from the pixel portion 110. Amplifying the signals with the column amplifier 130 amplifies the signal level of the pixels relative to the noise output downstream by the ramp circuit 140 and the column ADC 150, and the S/N ratio is equivalently improved. However, in a circuit structure in which the noise output by the ramp circuit 140 and the column ADC 150 is sufficiently small relative to the noise output by the pixel portion 110, the column amplifier 130 is not necessarily needed.

A constant voltage input circuit 400 can provide a fixed voltage to a video signal line prior to input to the column amplifier 130. This circuit is described as a constant potential circuit in the present embodiment, but may be a clip circuit that clips a signal at a certain voltage or the like.

The ramp circuit 140 is a signal generator that can generate a ramp shaped voltage signal that has a constant slope (gradient) in the time direction. The slope of the ramp can be controlled with a reference voltage. The reference voltage may be supplied from outside of the image sensor, or the constant voltage input circuit 400 may be controlled by serial communication and the like to supply a reference voltage.

The column ADC 150 includes a comparison portion 151 that compares an output signal from the column amplifier 130 and a signal from the ramp circuit 140, and holds the signal that has undergone A/D conversion due to the comparison in a counter/latch circuit 152. Detailed operations are described below. One line's worth of image data held by the counter/latch circuit 152 is sequentially output by the horizontal transfer circuit 160 from the pixel data at the edge.

The output from the horizontal transfer circuit 160 is input to the signal processing circuit 170. The signal processing circuit 170 is a circuit that performs digital signal processing and in addition to applying an offset value of a certain amount in the digital processing, the signal processing circuit 170 can perform simple gain operations by performing shift operations and multiplication. Also, a pixel region that is intentionally shaded may be provided in the pixel portion 110, and a digital black level clamp operation that uses this pixel region may be performed.

The output from the signal processing circuit 170 is input to the external output circuit 180. The external output circuit 180 has a serializer function, and converts multi-bit input parallel signals from the signal processing circuit 170 into serial signals. Also, image information is delivered by converting these serial signals into LVDS signals or the like, for example, and outputting the signals to an external device (in this case, the image processing LSI 2).

Next, A/D conversion using the column ADC 150 of the image sensor 1 will be described using FIGS. 2A and 2B. The column ADC 150 internally includes the comparison portion 151 and the counter/latch circuit 152, and the comparison portion 151 compares an output signal VAMP from the column amplifier 130 and a ramp signal VRAMP output from the ramp circuit 140, and outputs the result. The counter/latch circuit 152 performs a count operation during the period from when the counter is reset until when the output from the comparison portion 151 is reversed. A count value that is proportional to the output signal level of the column amplifier 130 is obtained with this operation, and therefore this count value serves as the A/D conversion result.

Figure 2B:
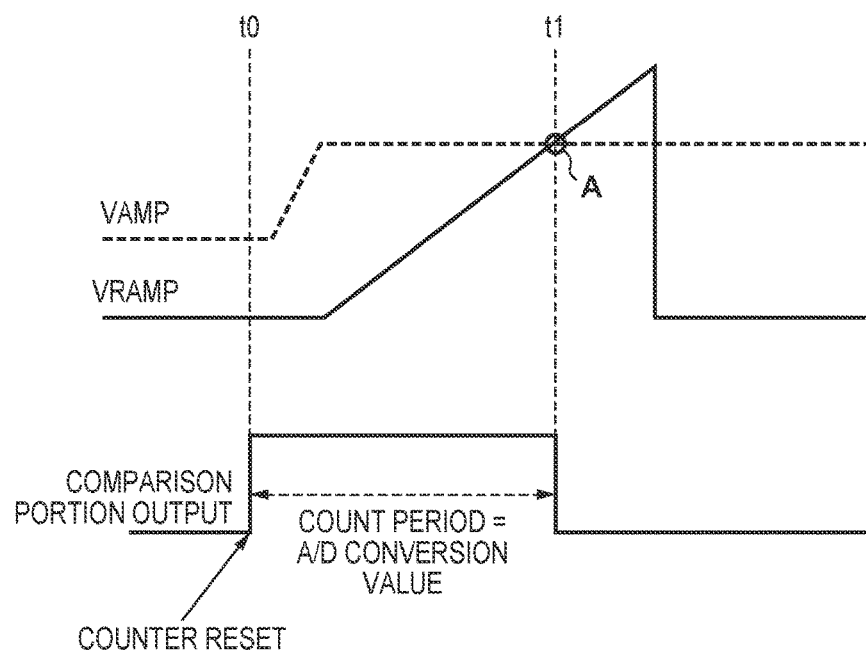

FIG. 2B is a diagram showing the relation between the output signal VAMP from the column amplifier 130 and the slope of the ramp signal VRAMP that is output from the ramp circuit 140. The count value of the period from a time t0 at which the counter is reset until a time t1 at which the output from the comparison portion 151 is reversed at point A serves as the A/D conversion value. Changing the slope of the lamp signal VRAMP changes the timing at which the output from the comparison portion 151 is reversed, and the gain of the A/D conversion result can be changed by changing the counting time period.

Generally, in A/D conversion of a unit pixel, output and A/D conversion of the N level (noise level) are first performed, and then output and A/D conversion of the S level (noise level+signal level) are performed. A difference operation S level−N level is performed on these two signals by the signal processing circuit 170, and a video signal with a favorable S/N ratio can be obtained by cancelling out the noise components.

Next, the lateral smear phenomenon that occurs in the image sensor 1 will be described. FIG. 3A depicts an image in a case where an image of a subject in which the center portion has very high luminance and the portion surrounding the high luminance portion is a constant gray was captured. If lateral smearing occurs in an image capture situation such as that in FIG. 3A, the central high luminance portion becomes darker than the surrounding video in the horizontal direction as shown in FIG. 3B.

Regarding the portion indicated by the dashed line, if the video signal level is plotted line-by-line, the signal level is constant in FIG. 3A, but in FIG. 3B, a difference in level indicated by B occurs in the video signal level. This level difference in the signal is the size of the lateral smearing and the larger the level difference the more the video appears to be unnatural. With such lateral smearing, the level at which the lateral smearing occurs and the place at which the lateral smearing occurs in the image sensor differ depending on the image sensor.

Figure 4A:
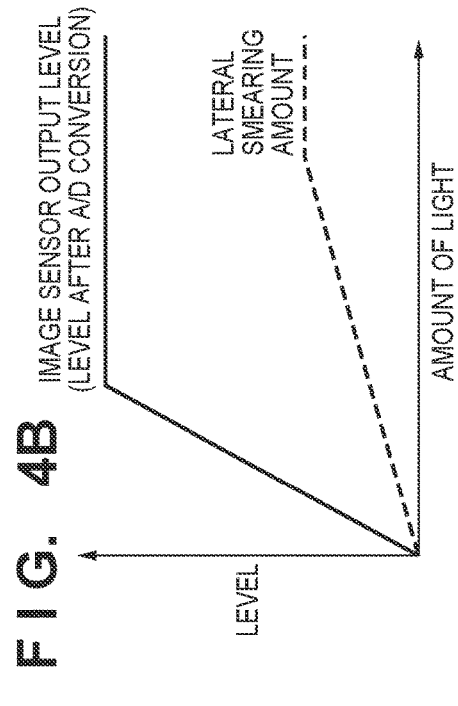
FIGS. 4A to 4D are graphs showing an amount of light and an output level for each portion and a lateral smearing amount.

In the present embodiment, the case where lateral smearing occurs in the column amplifier 130 is considered. Also, the case where the lateral smearing amount is proportional to the integrated value of single lines of video input signal levels that are input to the column amplifier 130 is considered. FIG. 4A is a graph showing the output signal level of the column amplifier 130 and the lateral smearing amount relative to the amount of entered light, with the amount of light that enters the image sensor shown in the horizontal axis and level shown on the vertical axis. The solid line in the graph indicates the output signal level of the column amplifier 130 and the dashed line indicates the lateral smearing amount. When the amount of light increases, the output level of the column amplifier 130 attains a saturation level, and the lateral smearing amount is also saturated at the same time. This saturation level depends on mostly the power supply voltage of the column amplifier 130.

Figure 4B:
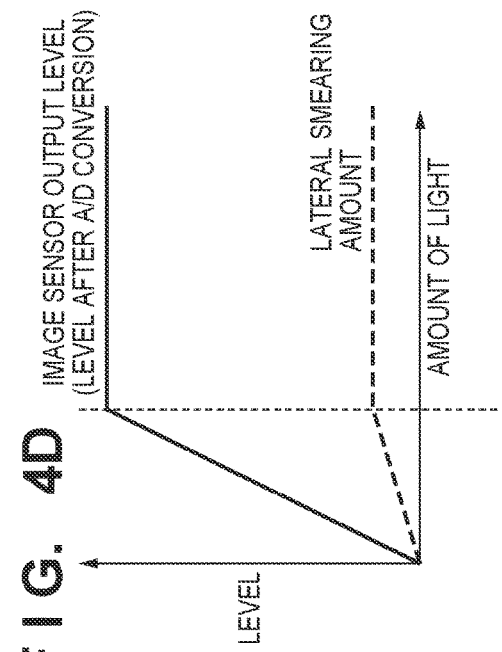

FIG. 4B is a graph similar to that of FIG. 4A, but the solid line indicates a signal level of an output signal from the column amplifier 130 that has undergone A/D conversion by the column ADC 150. The A/D converted signal level is saturated at a smaller amount of light than the amount of light at which the output signal level of the column amplifier 130 in FIG. 4A is saturated. This is for setting a conversion gain such that the A/D converted digital data is saturated at a smaller amount of light than the amount of light at which the output signal level of the column amplifier 130 is saturated in order to convert the linear portions of the output signal from the column amplifier 130 into digital signals.

Figure 5:
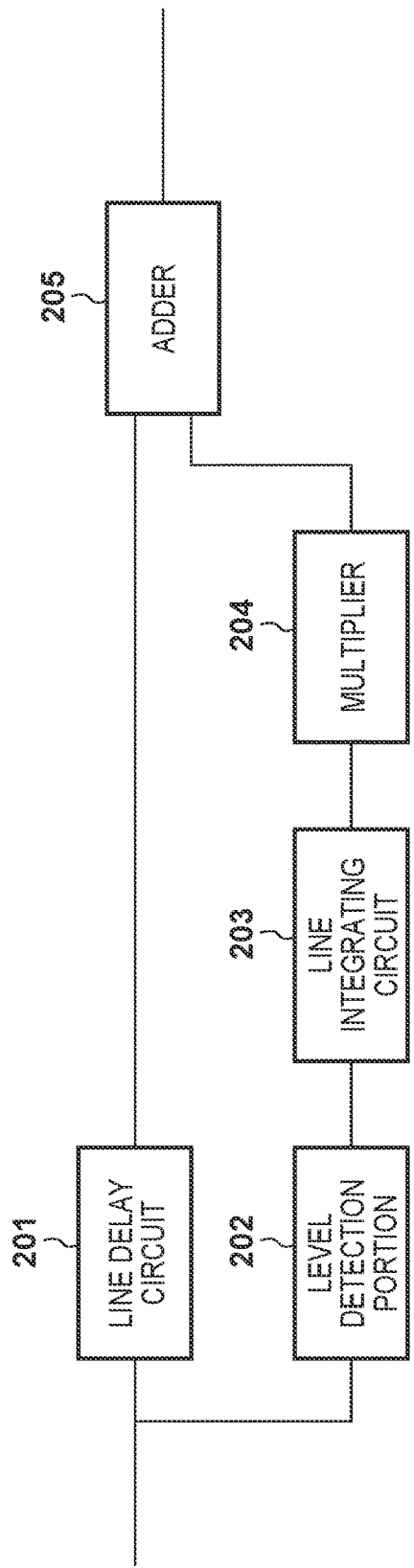
FIG. 5 is a block diagram showing a configuration of a lateral smearing correction circuit.

FIG. 5 is a block diagram showing an example of a lateral smearing correction circuit of the image processing LSI 2. Also, FIG. 3C is a diagram showing the level of the video signal and the level of the correction value. A line delay circuit 201 in FIG. 5 temporarily saves the input video signal to a memory, and adjusts the timing at which the video signal is output to an adder 205 of a subsequent stage. A level detection portion 202 detects the level of the input video signal (pixel signal), and a line integrating circuit 203 integrates or averages the level of the video signal line-by-line, and calculates the total of single lines of the video signal levels. This value corresponds to the integrated value in FIG. 3C.

The total of video signal levels for the respective lines calculated by the line integrating circuit 203 is multiplied by a fixed coefficient by a multiplier 204, and the result of the multiplication is set as the correction value. This value corresponds to the correction value in FIG. 3C. The difference in lateral smearing is cancelled out, as is shown by the video signal level of FIG. 3C to which the correction value has been added, as a result of the adder 205 adding each line of the video signal delayed by the line delay circuit 201 and the correction value for each line calculated by the multiplier 204.

Figure 4C:
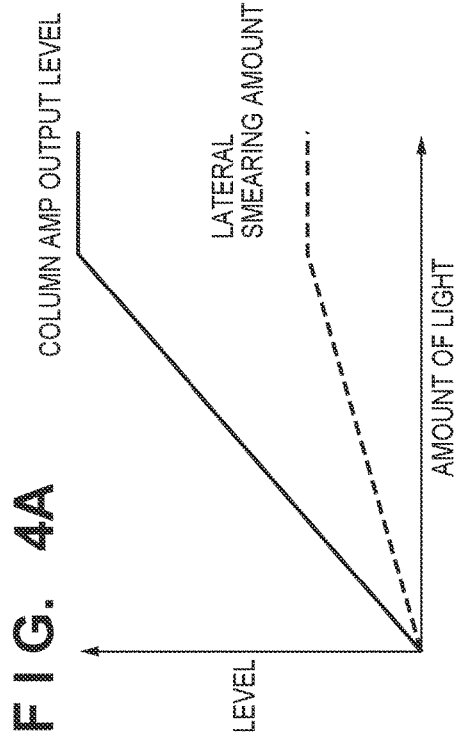

Here, as shown in FIGS. 4A and 4B, the A/D converted video signal attains a saturation level at a smaller amount of light than that of the video signal prior to A/D conversion. In contrast to this, the amount of light at which the lateral smearing is saturated is the same amount of light at which the video signal prior to A/D conversion is saturated. For this reason, in the A/D converted video signal, when the level of the high luminance portion at the center of the screen is already saturated, a misaligned region occurs in which the video signal level after A/D conversion and the lateral smearing amount are not proportional, as is shown in FIG. 4C.

Figure 6:
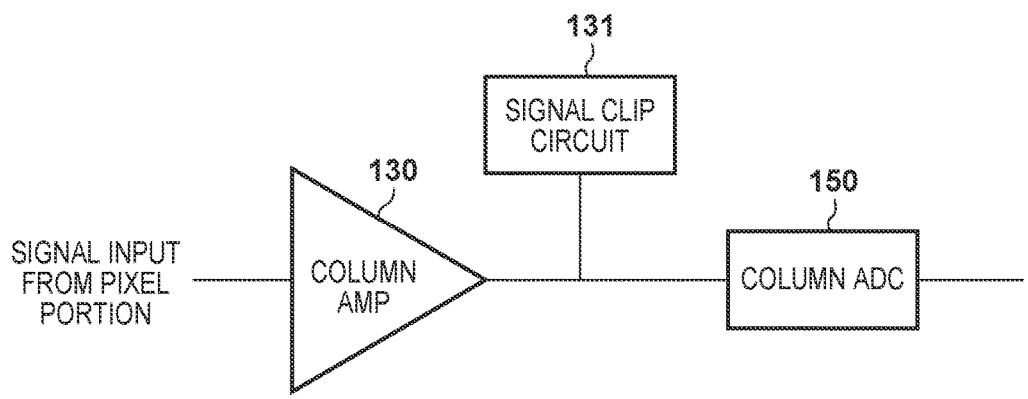
FIG. 6 is a diagram showing a signal clip circuit according to the first embodiment.

FIG. 6 is a block diagram showing the signal clip circuit and peripheral circuits according to the first embodiment. In the present embodiment, as shown in FIG. 6, a signal clip circuit 131 is provided between the output of the column amplifier 130 and the column ADC 150. The signal clip circuit 131 is a circuit that clips an analog signal that exceeds a predetermined signal voltage level. The signal voltage level at which clipping is performed may be set by inputting a direct control voltage to the signal clip circuit 131 or be set using serial communication. Also, in FIG. 6, the signal clip circuit 131 is described as being provided separately from the column amplifier 130, but the signal clip circuit 131 may be mounted in the column amplifier 130.

Here, in order to prevent a misaligned region in which the video signal level after A/D conversion and the lateral smearing amount are not proportional from occurring, the voltage level at which the signal is clipped is set to match the maximum value of the ramp signal VRAMP that determines the A/D conversion range.

Figure 4D:
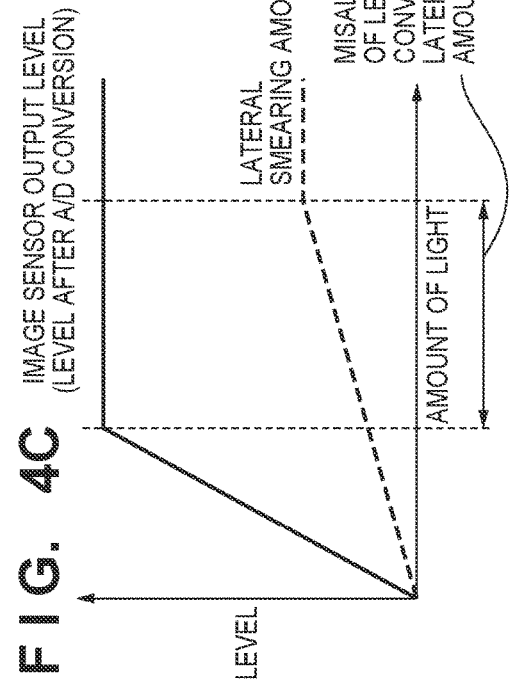

FIG. 4D is a diagram showing the video signal level after A/D conversion and the lateral smearing amount in the case where setting has been performed by the signal clip circuit 131 such that the maximum amplitude of the analog voltage to be input to the column ADC 150 matches the maximum value of the ramp signal VRAMP. Digital data of the video signal output from the column ADC 150 and the lateral smearing amount are proportional, and therefore favorable correction can be performed by the correction circuit shown in FIG. 5.

However, owing to the characteristics of analog circuits, it is conceivable that the clip level cannot be set to completely coincide with the maximum value of the ramp signal VRAMP due to factors such as the impedance of the electric circuit and wiring in the image sensor. In this case, the clip level may be set to be slightly smaller than the maximum value of the ramp signal VRAMP, and a digital gain may be applied by the image processing LSI 2 of a subsequent stage. Note that the correction circuit realized by the image processing LSI 2 described above is one example, and similar effects can also be obtained with correction performed using an OB clamp as disclosed in Japanese Patent Laid-Open No. 2014-165676, for example.

As described above, lateral smearing can be favorably corrected by controlling the clip level of the column amplifier output and the adjustable A/D conversion range with respect to lateral smearing generated in the column amplifier portion of the image sensor.

Second Embodiment

As described in the first embodiment, if lateral smearing occurs in the column amplifier 130, providing a signal clip circuit in the column amplifier 130 will have an effect. However, even if the output signal from the column amplifier 130 is clipped with respect to a lateral smear that occurred in a pixel portion that is upstream of the column amplifier 130, the lateral smearing amount and A/D converted data will not coincide. A method for resolving this is illustrated in the second embodiment.

Figure 7:
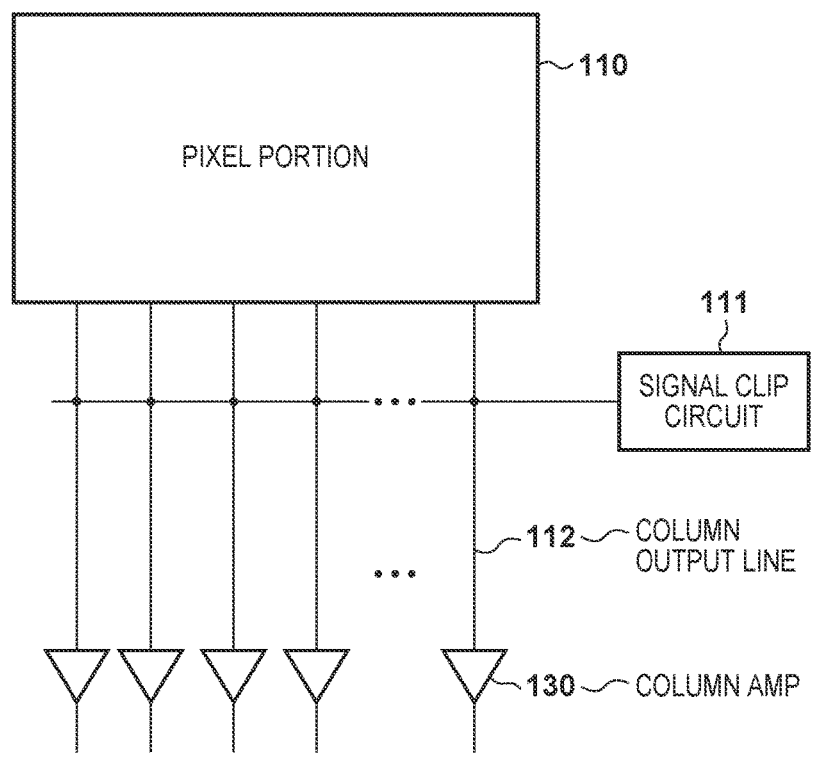
FIG. 7 is a diagram showing a signal clip circuit according to a second embodiment.

FIG. 7 is a block diagram showing the signal clip circuit and peripheral circuits according to the second embodiment. In the present embodiment, as shown in FIG. 7, the signal clip circuit 111 is connected to the column output lines 112 that input analog signals from the pixel portion 110 to the column amplifier 130. In this case, if the gain of the column amplifier 130 is a multiple of n, there is a need to determine a clip amount of the column output lines by counting back an amount that corresponds to n times the gain of the column amplifier 130. If the maximum value of the ramp signal VRAMP that determines the A/D conversion range is given as a, the voltage magnitude at which the signal clip circuit 111 of the column output line 112 is to be clipped will be a/n.

By setting such a clip amount, the maximum value of the analog voltage to be input to the column ADC 150 can be matched to the ramp signal VRAMP that determines the A/D conversion range. For this reason, the lateral smearing amount is saturated when the A/D conversion value is saturated, and therefore the lateral smear can be favorably corrected with a correction circuit such as that shown in FIG. 5.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-041774, filed Mar. 3, 2015, which is hereby incorporated by reference herein in its entirety.

What is claimed is:

1. An image capturing apparatus comprising:
   a pixel portion in which pixels that convert entered light into electric signals are arranged in a matrix;
   a column output line provided for each pixel column of the pixel portion;
   a clip circuit configured to clip, at a predetermined signal level, signals respectively output from the pixels to the column output lines;
   an A/D converter configured to A/D convert the signals clipped by the clip circuit;
   a controller circuit configured to change a signal level at which clipping is performed by the clip circuit, according to a maximum value of a conversion range of the A/D converter; and a correction circuit configured to correct streak-shaped or band-shaped noise of the A/D converted signals in a line direction caused by high luminance light that enters the pixel portion, wherein the clip circuit is arranged at a preceding stage of a comparison circuit of the A/D converter and clips analog signals respectively output from the pixels to the column output lines, and
   wherein the analog signals are clipped to a value that is smaller than a maximum value of a ramp signal input to the comparison circuit and a digital gain is applied to the A/D converted signals to compensate a difference between the clipped value and the maximum value of the ramp signal.

2. The image capturing apparatus according to claim 1, wherein the controller circuit changes the signal level at which clipping is performed by the clip circuit so as to be a value slightly smaller than the maximum value of the conversion range of the A/D converter.

3. The image capturing apparatus according to claim 1, further comprising:
   a column amplifier configured to amplify the signals output to the column output lines,
   wherein the clip circuit is provided in a subsequent stage to the column amplifier.

4. The image capturing apparatus according to claim 1, further comprising:
   a column amplifier configured to amplify the signals output to the column output lines,
   wherein the clip circuit is provided in the column amplifier.

5. The image capturing apparatus according to claim 1, further comprising:
   a column amplifier configured to amplify the signals output to the column output lines,
   wherein the clip circuit is provided between the pixel portion and the column amplifier.

6. The image capturing apparatus according to claim 1, wherein the A/D converter is configured to adjust the A/D conversion range by changing a reference voltage.

7. The image capturing apparatus according to claim 1, wherein the correction circuit includes:
   an integration circuit configured to integrate pixel signals of respective lines;
   a multiplier circuit configured to calculate a correction value from a line integration value obtained by the integration circuit; and
   an adding circuit configured to add the correction value to the pixel signals of the lines used in integration.

8. A method for controlling an image capturing apparatus that includes a pixel portion in which pixels that convert entered light into electric signals are arranged in a matrix and a column output line provided for each pixel column of the pixel portion, the method comprising:
   clipping, at a predetermined signal level, signals respectively output from the pixels to the column output lines;
   A/D converting the signals clipped in the clipping;
   changing a signal level at which clipping is performed in the clipping according to a maximum value of a conversion range in the A/D conversion; and correcting streak-shaped or band-shaped noise of the A/D converted signals in a line direction caused by high luminance light that enters the pixel portion, wherein the clipping is executed at a preceding stage of a comparison circuit of the A/D converter to clip analog signals respectively output from the pixels to the column output lines, and wherein the analog signals are clipped to a value that is smaller than a maximum value of a ramp signal input to the comparison circuit and a digital gain is applied to the A/D converted signals to compensate a difference between the clipped value and the maximum value of the ramp signal.

9. A non-transitory computer-readable storage medium storing a program for causing a computer to execute each step of a control method for an image capturing apparatus that includes a pixel portion in which pixels that convert entered light into electric signals are arranged in a matrix and a column output line provided for each pixel column of the pixel portion, the control method comprising:

clipping, at a predetermined signal level, signals respectively output from the pixels to the column output lines;

A/D converting the signals clipped in the clipping;

changing a signal level at which clipping is performed in the clipping according to a maximum value of a conversion range in the A/D conversion; and correcting streak-shaped or band-shaped noise of the A/D converted signals in a line direction caused by high luminance light that enters the pixel portion, wherein the clipping is executed at a preceding stage of a comparison circuit of the A/D converter to clip analog signals respectively output from the pixels to the column output lines, and wherein the analog signals are clipped to value that is smaller than a maximum value of a ramp signal input to the comparison circuit and a digital gain is applied to the A/D converted signals to compensate a difference between the clipped value and the maximum value of the ramp signal.

* * * * *